(12) United States Patent
Havens-Olmstead

(10) Patent No.: US 9,004,680 B2
(45) Date of Patent: Apr. 14, 2015

(54) EYEWEAR ATTACHMENTS, EYEWEAR ASSEMBLIES, AND METHODS OF AFFIXING EYEWEAR

(76) Inventor: Michelle Renee Havens-Olmstead, Spokane, WA (US)

(*) Notice: Subject to any disclaimer, the term of this patent is extended or adjusted under 35 U.S.C. 154(b) by 396 days.

(21) Appl. No.: 13/291,823

(22) Filed: Nov. 8, 2011

(65) Prior Publication Data

US 2012/0050666 A1 Mar. 1, 2012

Related U.S. Application Data

(63) Continuation-in-part of application No. 12/803,303, filed on Jun. 24, 2010, now abandoned.

(51) Int. Cl.
*G02C 5/16* (2006.01)
*G02C 5/12* (2006.01)

(52) U.S. Cl.
CPC .................................... *G02C 5/126* (2013.01)

(58) Field of Classification Search
CPC .............. G02C 1/02; G02C 1/04; G02C 1/06; G02C 5/12; G02C 5/02
USPC ........... 351/76, 78, 80, 82, 88, 136, 137, 138, 351/124, 125
See application file for complete search history.

(56) References Cited

U.S. PATENT DOCUMENTS

| | | |
|---|---|---|
| 1,393,152 A | 10/1921 | Miller |
| 3,228,696 A | 1/1966 | Hull |
| 3,233,250 A | 2/1966 | Jonassen |
| 4,131,341 A | 12/1978 | Bradley et al. |
| 4,178,080 A | 12/1979 | Elder |
| 4,405,214 A | 9/1983 | Bolle |
| 5,131,737 A * | 7/1992 | Pernicka ................ 351/88 |
| 5,413,119 A | 5/1995 | Guerrant |
| 5,526,070 A | 6/1996 | Simioni |
| 5,771,087 A | 6/1998 | Martin et al. |
| 5,828,438 A | 10/1998 | Kuo-Tseng |
| 6,106,117 A | 8/2000 | Huang Lin |
| 6,520,636 B2 | 2/2003 | Saitoh et al. |
| 6,976,756 B1 | 12/2005 | Chen |
| 7,585,072 B1 | 9/2009 | Wang-Lee |
| 7,594,723 B2 | 9/2009 | Jannard et al. |
| 7,631,967 B1 | 12/2009 | Huang |
| 2008/0170200 A1 | 7/2008 | Chen |
| 2010/0225879 A1 | 9/2010 | Pulito |
| 2010/0231850 A1 | 9/2010 | Hones |

* cited by examiner

Primary Examiner — Hung Dang
(74) Attorney, Agent, or Firm — Wells St. John P.S.

(57) ABSTRACT

Eyewear attachments are provided that can include a bridge pad having a base extending between terminal ends and defining a perimeter, and each terminal end having a tower extending normally from the base and forming at least a portion of a top opposing the base of the bridge pad. Eyewear assemblies are provided that can include a frame having a bridge extending between two lense housings, each of the lense housings have an upper portion opposing a lower portion of the housed lense, and a bridge pad coupled to the frame. Methods of affixing eyewear in useful configuration are provided that can include, providing eyewear having a bridge pad, the bridge pad extending away from the eyewear and toward the face when the eyewear is in the worn position, and aligning at least a portion of the bridge pad below an upper portion of the orbital bone of the face.

3 Claims, 5 Drawing Sheets

EYEWEAR ATTACHMENTS, EYEWEAR ASSEMBLIES, AND METHODS OF AFFIXING EYEWEAR

CROSS REFERENCE TO RELATED APPLICATION

This patent application is a continuation-in-part of U.S. patent application Ser. No. 12/803,303 filed Jun. 24, 2010, entitled "Eyewear With Stabilization Nosepiece", now abandoned, the entirety of which is incorporated by reference herein.

TECHNICAL FIELD

The field of the invention relates generally to eyewear attachments and assemblies as well as methods of affixing eyewear in useful configurations, particularly embodiments of the disclosure relate to bridge caps as attachments and as part of the eyewear assemblies.

BACKGROUND

Traditionally, eyewear has been used for multiple purposes. It has been used to protect the eyes from damage in workplace situations. They are also used to correct vision inadequacies. Eyewear is also used to shade the eyes from distracting or harmful sunlight. Sometimes it becomes important for the eyewear user to tilt their head upward to more closely view subject matter above their head at that time. In some of these cases, the user's eyewear will slide toward their forehead and away from the useful protection of the eye. The present disclosure provides eyewear attachments and assemblies as well as methods of affixing eyewear in useful configurations that overcome deficiencies of previous eyewear attachments and assemblies.

SUMMARY OF THE DISCLOSURE

Eyewear attachments, assemblies, and methods of affixing eyewear in useful configurations are provided.

BRIEF DESCRIPTION OF THE DRAWINGS

Embodiments of the disclosure are described below with reference to the following accompanying drawings.

FIGS. 1 and 1A are a depiction of a user adorned with eyewear in one configuration according to an embodiment of the disclosure.

FIGS. 2 and 2A are a user adorned with eyewear in a different configuration according to an embodiment of the disclosure.

DESCRIPTION

This disclosure is submitted in furtherance of the constitutional purposes of the U.S. Patent Laws "to promote the progress of science and useful arts" (Article 1, Section 8).

The present disclosure provides eyewear attachments, assemblies, and methods of affixing eyewear in useful configurations. These attachments, assemblies, and methods will be described with reference to FIGS. 1-6.

Figure 1:
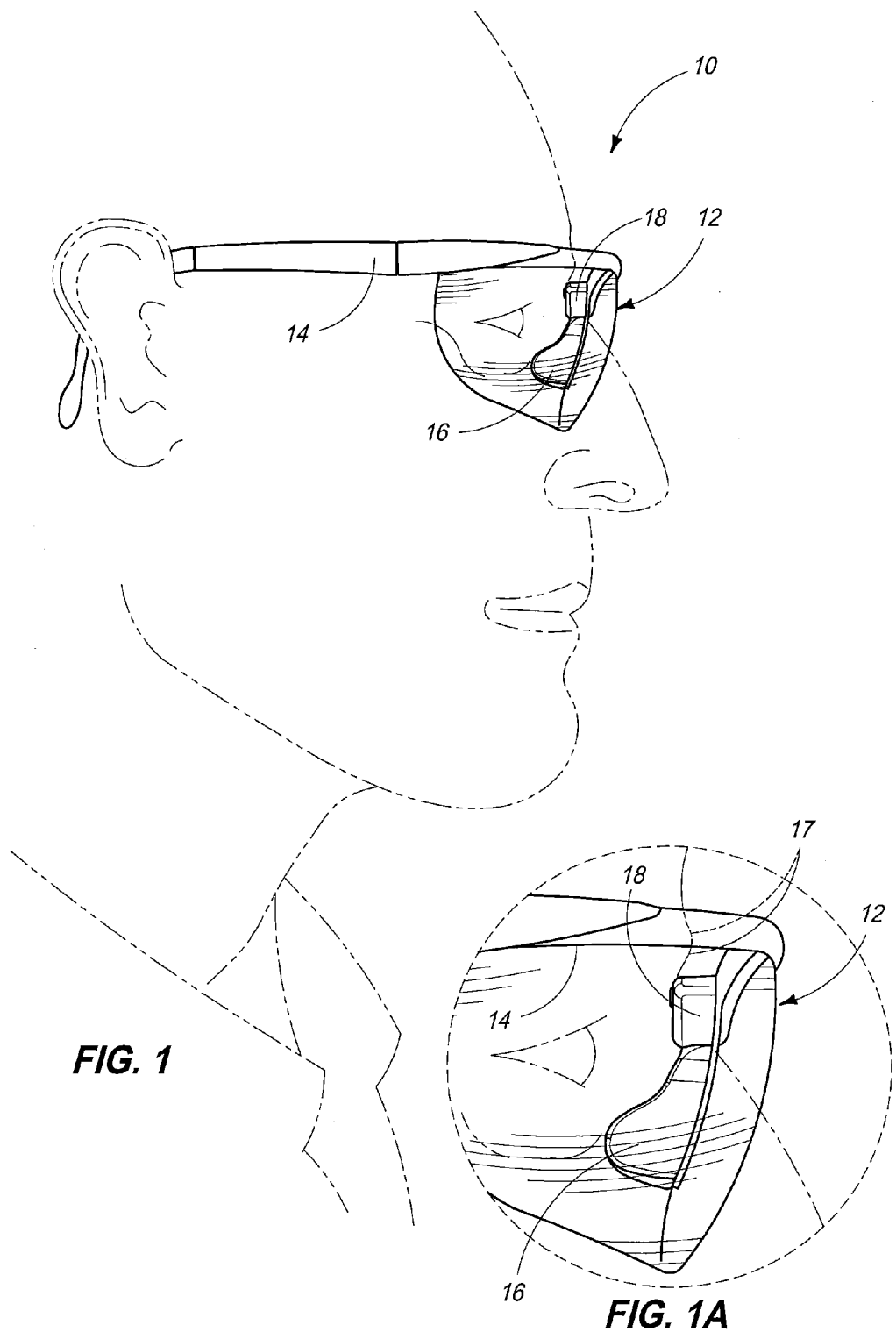

Referring first to FIG. 1, a wearer 10 is shown adorned with eyewear assembly 12 in a useful position. In accordance with example implementations, eyewear 12 includes glasses 14 having an eyewear attachment 16 coupled thereto. According to example implementations, this eyewear attachment can be considered a bridge pad, a combination bridge pad and nose pad, and can also be considered a nose-brow platform or stabilization nose piece according to example implementations.

In accordance with example embodiments, bridge pad 18 can extend away from the eyewear and towards the face of the wearer in the worn position. Example methods include aligning at least a portion of bridge pad 18 below an upper portion of the orbital bone 17 as shown in FIG. 1A.

Figure 2:
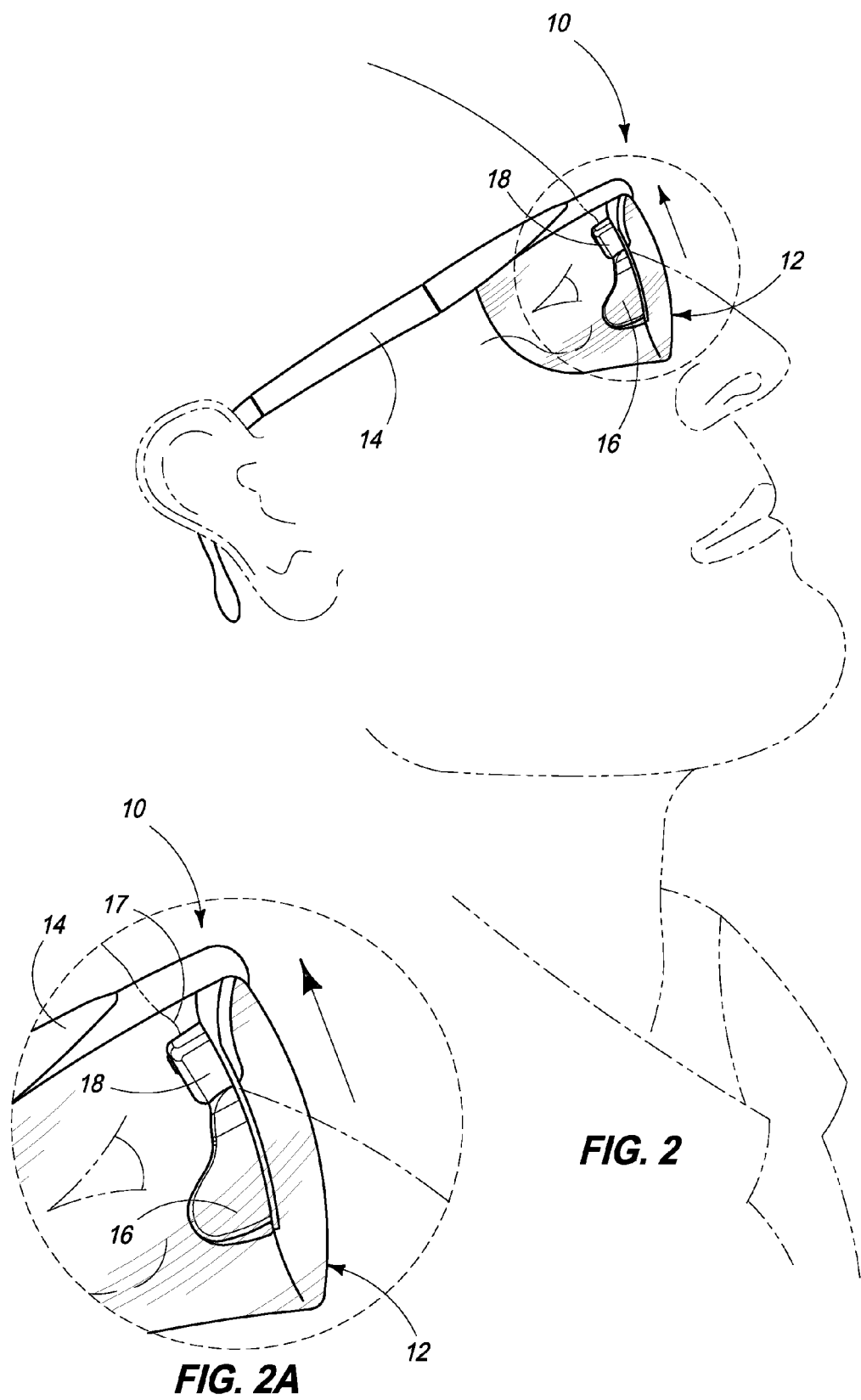

Referring to FIG. 2, wearer 10 is shown with his head tilted back in order to view objects above his normal eye line. In accordance with example implementations, his view is aligned in an upward position and bridge pad 18 engages a least a portion of orbital bone 17 to prevent eyewear 12 from sliding away from the worn position and towards the forehead of user 10. In accordance with example implementations, engagement of orbital bone 17 by bridge pad 18 cushions the force of eyewear 12, engaging orbital bone 17. Bridge pad 18 can be configured to flex and/or absorb these forces. In accordance with example implementations, one or both of the curved bias of bridge pad 18 and/or the hollow configuration, as well as the coupling of bridge pad 18 to eyewear 14 can allow for this cushioning.

Figure 3:
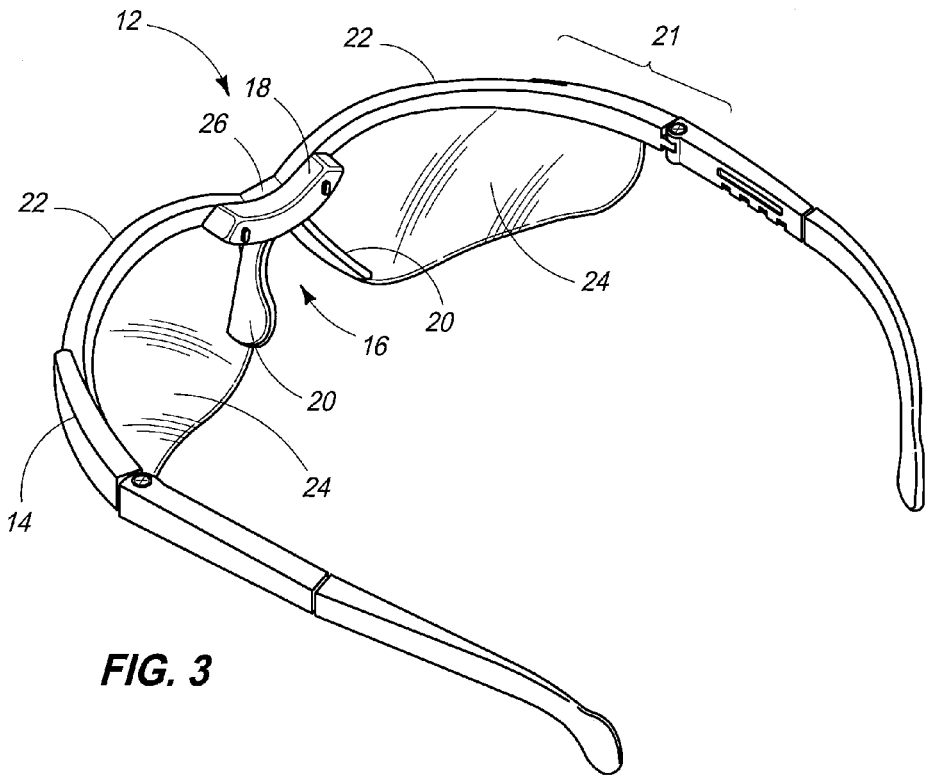
FIGS. 3 and 4 are depictions of eyewear in two perspectives according to embodiments of the disclosure.
Figure 4:
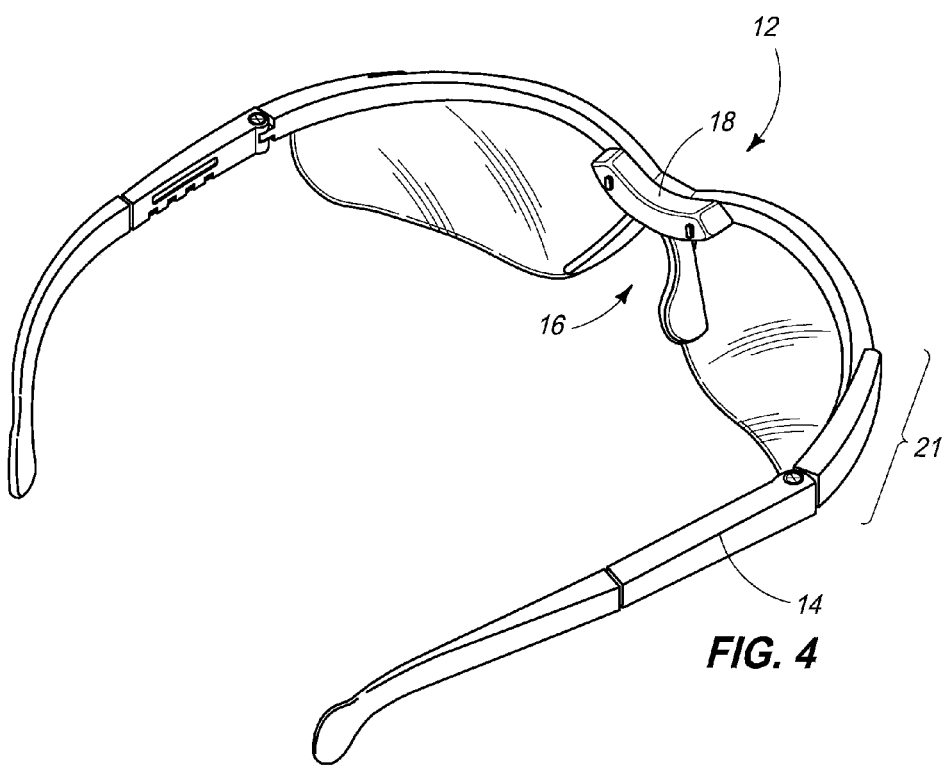

Referring to FIGS. 3 and 4, more detailed views of eyewear assembly 12 are shown that include eyewear engaging eyewear attachment 16. In accordance with example implementations, eyewear attachment 16 can include bridge pad 18, for example. Eyewear 14 can include a frame 21 that comprises a bridge 26 extending between two lense housings or rims 22. Rims 22 can engage and couple with lenses 24. In accordance with example implementations, each of the lense housings or rims 22 can have an upper portion opposing a lower portion of housed lense 24, for example. In accordance with example implementations, bridge pad 18 can be coupled to frame 21 and a least a portion of which can be aligned between the upper and lower portions of the upper portion of rims 22 and the lower portion of lenses 24, for example. Eyewear attachment 16 can further include beyond bridge pad 18 a nose pad 20. A nose pad can be defined by two complimentary portions, each portion configured to reside on opposing sides of wearer's nose. In accordance with example implementations, at least a portion of bridge pad 18 can compliment at least a portion of bridge 26 and/or rims 22, for example.

Figure 5:
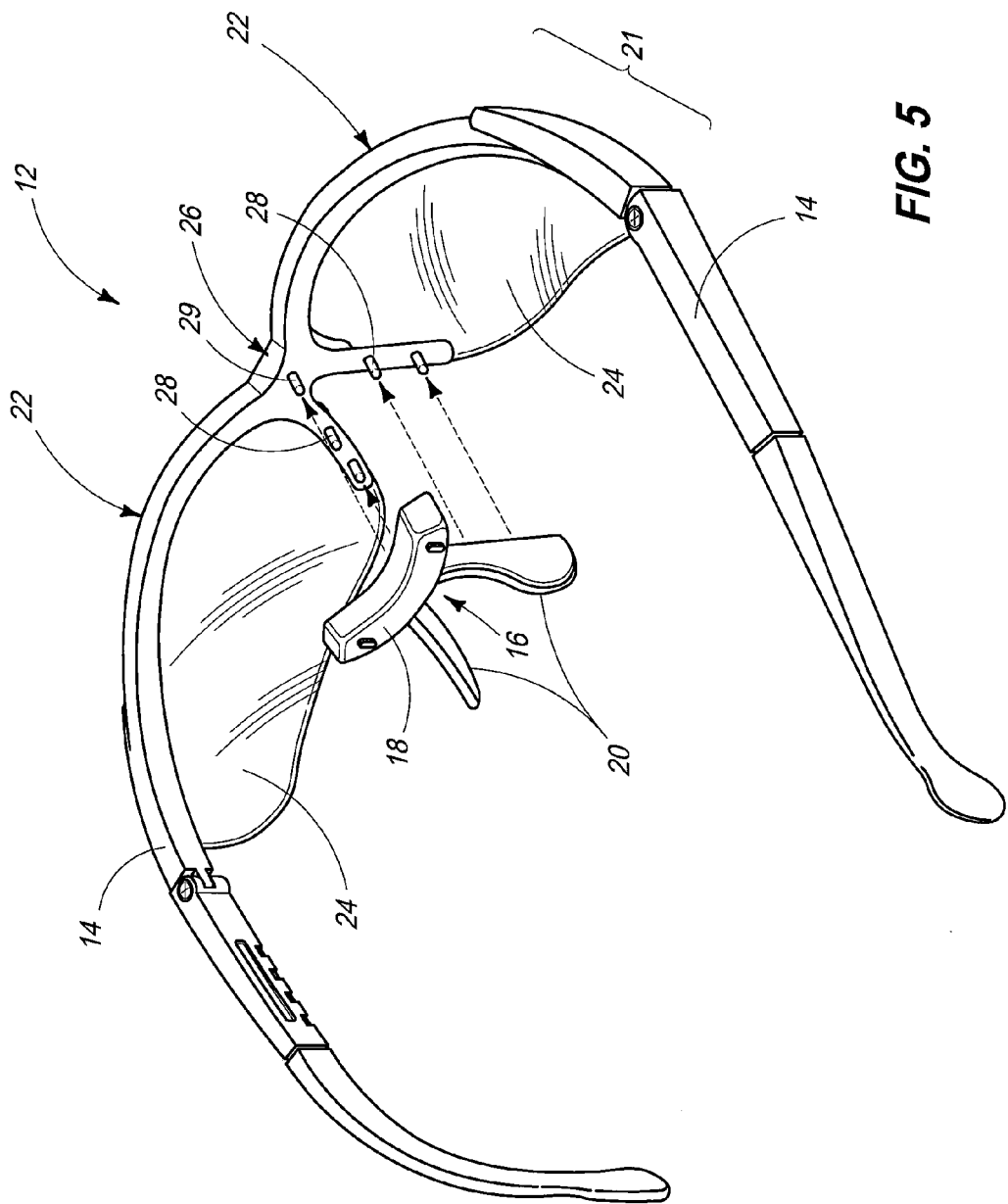
FIG. 5 is an exploded view of eyewear and an attachment according to an embodiment of the disclosure.
Figure 6B:
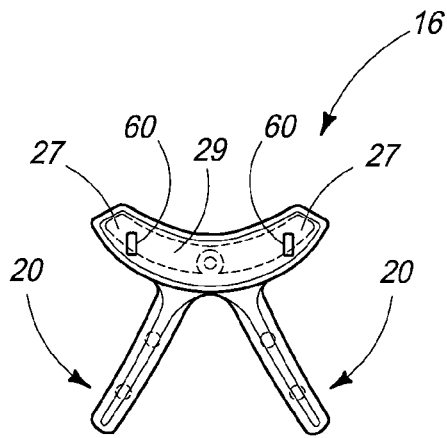
FIGS. 6A-6E are different views of an eyewear attachment according to an embodiment of the disclosure.
Figure 6C:
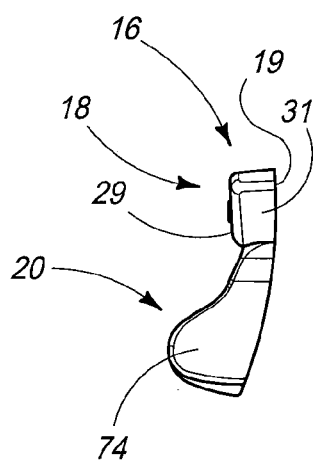
Figure 6A:
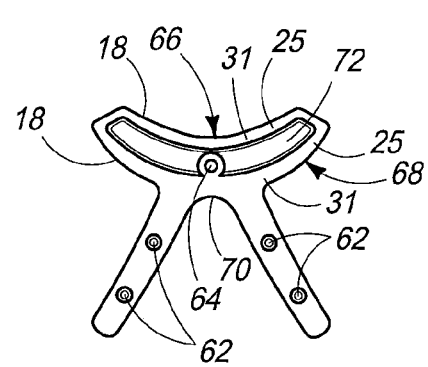
Figure 6D:
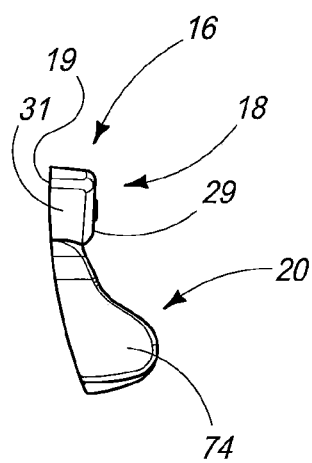
Figure 6E:
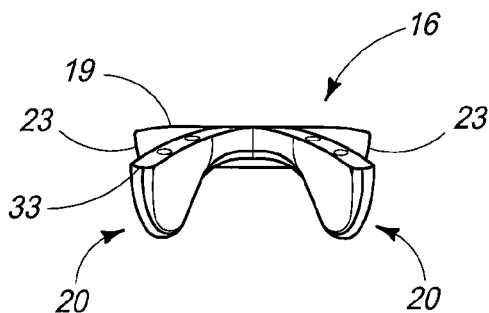

Referring next to FIG. 5, an exploded view of assembly 12 is shown that includes attachment 16 and eyewear 14. In example configurations, attachment 16 can couple with eyewear 14 via a plurality of extensions 28 and/or 29 from eyewear 14. These extensions can be configured to engage one or both of bridge pad 18 or nose pads 20, for example. In accordance with example configurations, post 28 can be configured to engage nose pads 20 while one or more posts can be configured to engage bridge pad 18. In accordance with example configurations, a single post 29, for example, can be utilized to engage a central portion of bridge pad 18, thereby allowing bridge pad 18 to pivot along post 19 in semicircular motions, for example. In accordance with example implementations, this engages bridge pad 18 to eyewear 14 in a manner allowing bridge pad 18 to be moveable in relation to frame 21 of eyewear 14. Attachment 16 can include complimentary openings configured to receive extensions 28 and 29, for example.

Referring next to FIGS. 6A-6E, eyewear attachment 16 is shown. As described, attachment 16 includes bridge pad 18 and nose pad 20, for example. Bridge pad 18 can include a base 19 configured to couple with eyewear, for example. The base can extend between two terminal ends 23 and define a perimeter 25. Each terminal end can have a tower 27 extending normally from base 19 and forming at least a portion of a top 29. In accordance with example implementations, bridge pad 18 can have a continual top forming the uppermost surface of top 29. In accordance with example configurations, perimeter 25 of base 19 of bridge pad 18 can be at least partially curved consistent with that of perimeter 66 for example. In accordance with example configurations proximate tower 27, round 60 can be associated therewith. In accordance with other example configurations, bridge pad 18 can further include a recess 72 extending at least a portion of bridge pad 18. A portion or all of bridge pad 18 can encompass a recess, and this recess can encompass the entire length of bridge pad 18. In accordance with example implementations, there can be space between opening 64 of bridge pad 18 to engage posts of eyewear, for example, and a wall 31.

Attachment 16 can further include a nose pad portion 20. Nose pad portion 20 can include a base 33 that is semicontiguous with base 19 of bridge pad 18, for example. Rising from base 33 of nose pad 20 can be a fanned portion 74 that is at least partially circular or semicircular in one cross section and defines a perimeter that continues from an extended portion proximate fan portion 74 to a narrower portion as it couples with bridge pad 18, for example. Nose pad portion 20 can be defined by an apex of curve 70 that extends to opposing portions making up nose pad 20. In accordance with example implementations, the highest extended portion of apex 70 resides below or does not extend as far as top 29 of bridge pad 18. Further, curve 70 can be a substantial parabola defined between portions of nose pad 20, for example. Attachment 16 can be manufactured from polymeric materials including but not limited to synthetic or natural rubber materials of various polymeric densities. As one example, the material can be a black rubber material and be substantially pliable. The material can be formed into the attachment via injection molding, for example.

The present disclosure provides attachments, eyewear assemblies, and methods that can overcome nose pads not supporting eyewear when the user is in an upright alert position, particularly when looking up. For at least the reason that standard safety glasses can consist of a single unit nose rest that can support the glasses without any upper frame support to the forehead or brow area, particularly the orbital bone of the brow area when a user is lying down or in an inclined position, the frame and lens may push into the user's eyes. Eyewear for safety applications and industrial, medical, and/or sports can be used to protect user's eyes. Such eyewear is usually designed to fit relatively close to user's face so that noxious gas, liquid, particles, contaminants and the like do not touch or affect the user's eyes or give rise to the fogging of lenses. Standard eyewear safety glasses that move and tip into the forehead can cause pressure on the eyelashes, creating visual problems as well as comfort issues. If the user is wearing makeup, especially mascara, this may cause smearing onto the lense and the user's face.

Safety and some sports glasses or eyewear are often designed and formed such that they are bulky and heavy to wear. Some are tight fitting and uncomfortable as well. Such eyewear is often provided in only a few sizes which do not fit the user's face. Further, poor fitting eyewear can result in movement of the user to adjust glasses, and then movement of the glasses may not adequately cover or protect the user's eyes. In medical uses of safety glasses, for example, especially dental surgery, the user is in an inclined position looking up. Standard glasses move around or may tip towards the forehead or tip into the eyes, making the patient uncomfortable during these dental procedures when using nitrous oxide and a large nose cone is used that seals around the user's nose. This can prevent the standard glasses nose rest to fit on the user's nose, causing the safety glasses to sit on top of the nose, resulting in the lense not covering or protecting the eyes.

In accordance with example implementations, the attachments, assemblies, and methods of the present disclosure can support the glasses on the face of the user, preventing movement in some or all directions, especially when the user is in a horizontal or inclined position looking up, or in various vertical viewing angles. Attachments, assemblies, and methods can maintain a space between the lense and the eyelashes resting between the brows of the user's face, thus improving comfort. According to example implementations, the attachments methods and assemblies may also be configured to allow air to flow freely beneath the frame and lense, and therefore prevent fogging of the lense, thus facilitating better vision. The attachment can be used in combination with the ear pieces of eyewear to create a tripod of support for the glasses on the ears and nose brow area. This support can distribute the weight of the glasses evenly over the user's face, making the glasses feel lightweight. Further, the present disclosure of the attachment and assemblies can provide a stabilized base to support and distribute weight of the glasses, nitrous oxide nose and hose weight during dental surgery when in the inclined position, for example. Further, the present disclosure can alleviate problems with safety glasses tipping into the forehead and the fogging of the lenses during medical or dental procedures. The patients are usually nervous and sweating; the fogging creates a panic when the vision is impaired.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method of affixing eyewear in useful configuration, the method comprising:
   providing eyewear having a bridge pad, the bridge pad extending away from the eyewear and toward the face when the eyewear is in the worn position, the bridge pad further extending laterally along a rim of the eyewear and above the lenses of the eyewear;
   aligning an entirety of the bridge pad below a frontal portion of the orbital bone of the face; and
   tilting the face back to align view in an upward position, the bridge pad engaging the orbital bone to prevent the eyewear from sliding away from the worn position.

2. The method of claim 1 wherein the bridge pad defines a uniform planar face opposing the wearer, the planar face defining a curve extending from one lateral portion above one lense through the bridge to another lateral portion above the other lense of the eyewear, the method further comprising cushioning the engagement of the orbital bone by engaging the orbital bones of the wearer with both the one and the other lateral portions, the curve of the planar face cushioning the engagement with the orbital bone.

3. The method of claim 1 wherein the bridge pad is at least partially hollow.

\* \* \* \* \*